(12) United States Patent
Kurashina et al.

(10) Patent No.: US 6,661,763 B2
(45) Date of Patent: Dec. 9, 2003

(54) OPTICAL DISK RECORDING APPARATUS AND RECORDING CONTROL METHOD FOR RECORDING DATA IN A LEAD-IN AREA AND A PROGRAM AREA

(75) Inventors: Hiroyuki Kurashina, Saitama (JP); Satoshi Koizumi, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/318,240

(22) Filed: Dec. 13, 2002

(65) Prior Publication Data

US 2003/0086350 A1 May 8, 2003

Related U.S. Application Data

(63) Continuation of application No. 09/604,465, filed on Jun. 27, 2000, now abandoned.

(30) Foreign Application Priority Data

Jun. 29, 1999 (JP) .......................................... 11-182939

(51) Int. Cl.$^7$ ................................................ G11B 5/76
(52) U.S. Cl. ................................ 369/59.25; 369/47.12; 369/53.37
(58) Field of Search .......................... 369/30.04, 30.07, 369/47.12, 47.13, 47.15, 53.2, 53.24, 53.37, 83, 84, 275.3, 59.25

(56) References Cited

U.S. PATENT DOCUMENTS

| 5,430,698 A | * | 7/1995 | Nonaka et al. ............ 369/30.1 |
| 5,515,351 A | | 5/1996 | Nonaka et al. |
| 5,526,331 A | * | 6/1996 | Park et al. ............... 369/47.12 |
| 5,587,979 A | | 12/1996 | Bluthgen |
| 5,825,726 A | | 10/1998 | Hwang et al. |
| 5,926,453 A | | 7/1999 | Muramatsu et al. |

FOREIGN PATENT DOCUMENTS

| EP | 0 446 995 A1 | 9/1991 |
| EP | 0 520 381 A3 | 12/1992 |
| EP | 0 520 381 A2 | 12/1992 |

* cited by examiner

*Primary Examiner*—Paul W. Huber
(74) *Attorney, Agent, or Firm*—Sughrue Mion, PLLC

(57) ABSTRACT

When the recording disk is in the partial recording condition in which the finalization is not completed, a control step (S63) to enter the inputted CD text data into the sub-code area of the program data and to record it in the program area, when the ejection command is received, is provided.

29 Claims, 11 Drawing Sheets

OPTICAL DISK RECORDING APPARATUS AND RECORDING CONTROL METHOD FOR RECORDING DATA IN A LEAD-IN AREA AND A PROGRAM AREA

This is a continuation of application Ser. No. 09/604,465 filed Jun. 27, 2000, now abandoned, the disclosure of which is incorporated herein by reference.

BACKGROUND OF THE INVENTION

The present invention relates to an optical disk recording apparatus and a recording control method, and specifically, to an optical disk recording apparatus and a recording control method, by which the related data relating to the optical disk such as the title or the name of a musical component, for example, the CD text is recorded in a lead-in area of the optical disk.

Recently, the spread of an optical disk recording and reproducing apparatus (CD-R/RW recorder) in which a CD-R(Compact Disc—Recordable) or CD-RW (Compact Disc ReWritable) format is adopted, is remarkable. According to this apparatus, when the program data is recorded in the program area and the disk is going to be ejected without finalizing (TOC data is written into the lead-in area), initially, the contents data relating to the program data recorded in the program area, such as the program number, the starting time or completion time of each program, or the like, is temporarily recorded in a program memory area (PMA) provided inside the lead-in area, and then, the disk is ejected.

However, in the PMA regulated by the CD-R or CD-RW format, even when it is judged from the viewpoint of its storage capacity, because the data format does not meet the CD text, it is difficult to record the CD text information.

Accordingly, in the CD-R/RW recorder, when the CD text is structured so as to be recordable, because the recorder can not temporarily store the CD text inputted by the user in the PMA, when the disk is ejected without being finalized, the inputted CD text information is cleared, and becomes useless at all. Therefore, it is necessary that, after the user completes the recording of all program in the CD-R, the CD text is inputted, and the disk is surely finalized. As described above, when the conventional CD-R/RW recorder is made to simply meet the CD text, there is a problem that the operability of the user for the CD text recording is very wrong.

On the one hand, the CD-R/RW recording software to control the CD-R drive for use in the personal computer is sold from many software manufacturers. In this recording software, there is the software satisfying the writing of the CD text, and in these software, there is the software having the function to temporarily store the CD text inputted by the user in the floppy disk drive (FDD) or hard disk drive (HDD) of the personal computer main body as a file so that the CD text inputted by the user does not become useless.

However, when the user continues to use this function, the files of the temporarily stored CD text are increased on and on in the disk drive, and there is a problem that it becomes difficult to found which file is the CD text file inputted and stored for which disk.

Also in the CD-R/RW recorder for the audio, the storage device such as the HDD or memory (SRAM) is provided, and the CD text inputted by the user can be temporarily stored in them. However, these storage devices are very expensive, and specifically, in the memory, because the capacity of more than 8 kbytes per one sheet of the disk is necessary to store the CD text, when the storage of the CD text of about 100 sheets is considered, the considerably large capacity memory is required. Further, as described above, the problem that the correspondence relationship between the disk and the stored file is not found: still remains.

SUMMARY OF THE INVENTION

The present invention provides an optical disk recording apparatus by which the above problems are solved, and is provided with a related data recording control means for temporarily recording the related data which is recorded in a lead-in area into a program area of an optical disk. The related data recording control means temporarily records the related data recorded in the lead-in area into the program area of the optical disk, when the optical disk is in a partial recording condition in which the finalization is not completed. Accordingly, even when the optical disk is ejected without being finalized, the inputted related data does not become useless. Further, because the recording is conducted on the disk, another storage device is not necessary, and further, the correspondence relationship of the disk with the related data can be always maintained.

Further, the present invention provides a recording control method by which the above problems are solved, and is provided with a step to temporarily record the related data which is recorded in a lead-in area into a program area. When the optical disk is in a partial recording condition in which the finalization is not completed, this step is conducted, and the related data is temporarily recorded in the program area of the optical disk. Accordingly, even when the optical disk is ejected without being finalized, the inputted related data does not become useless. Further, because the recording is conducted on the disk, another storage device is not necessary, and the correspondence relationship of the disk with the related data can be always maintained.

DETAILED DESCRIPTION OF THE PREFERRED EMBODIMENTS

Figure 1:
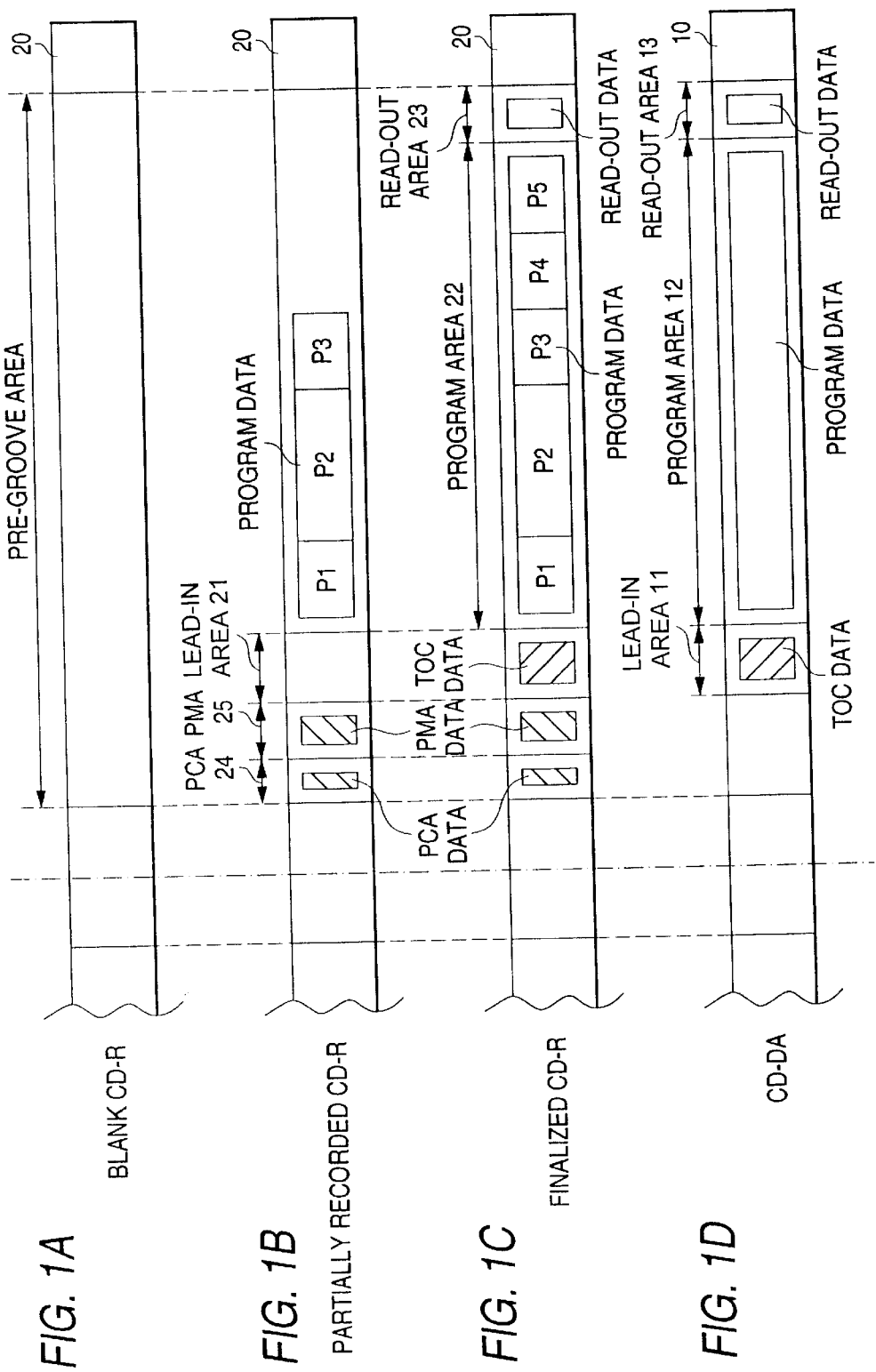
FIGS. 1A–1d are signal arrangements conceptual view of the CD-R and CD-DA.

Referring to the attached drawings, an embodiment of the present invention will be described below. FIG. 1 shows signal arrangement conceptual views of a CD-R (Compact Disc-Recordable) and CD-DA (Compact Disc-Digital Audio) which are recorded and reproduced by the apparatus of the present embodiment, and (A)–(C) respectively show a signal arrangement conceptual view of a blank CD-R, CD-R which is in the partial recording condition in which the finalization is not completed, and the CD-R in which the finalization is completed, and (D) shows a signal arrangement conceptual view of the CD-DA.

Initially, the signal arrangement of the CD-DA shown in FIG. 1(D) and its signal format will be described. As shown in FIG. 1(D), a CD-DA 10 is formed of, from its inner periphery, a read-in area 11 which is a control area in which the control data (TOC data) controlling a program is recorded, a program area 12 in which the program data is recorded, and a read-out area 13 in which the read-out data showing the completion of the program data is recorded.

The program data includes the audio data (voice data), which is the main data, and the sub-code data. The audio data is sampled at 16 bits, 44.1 kHz, and 1 word 16 bits is divided into the higher 8 bits and the lower 8 bits, and is defined as a symbol unit. An error correction coding processing and interleave processing are added to the symbol unit.

Figure 2:
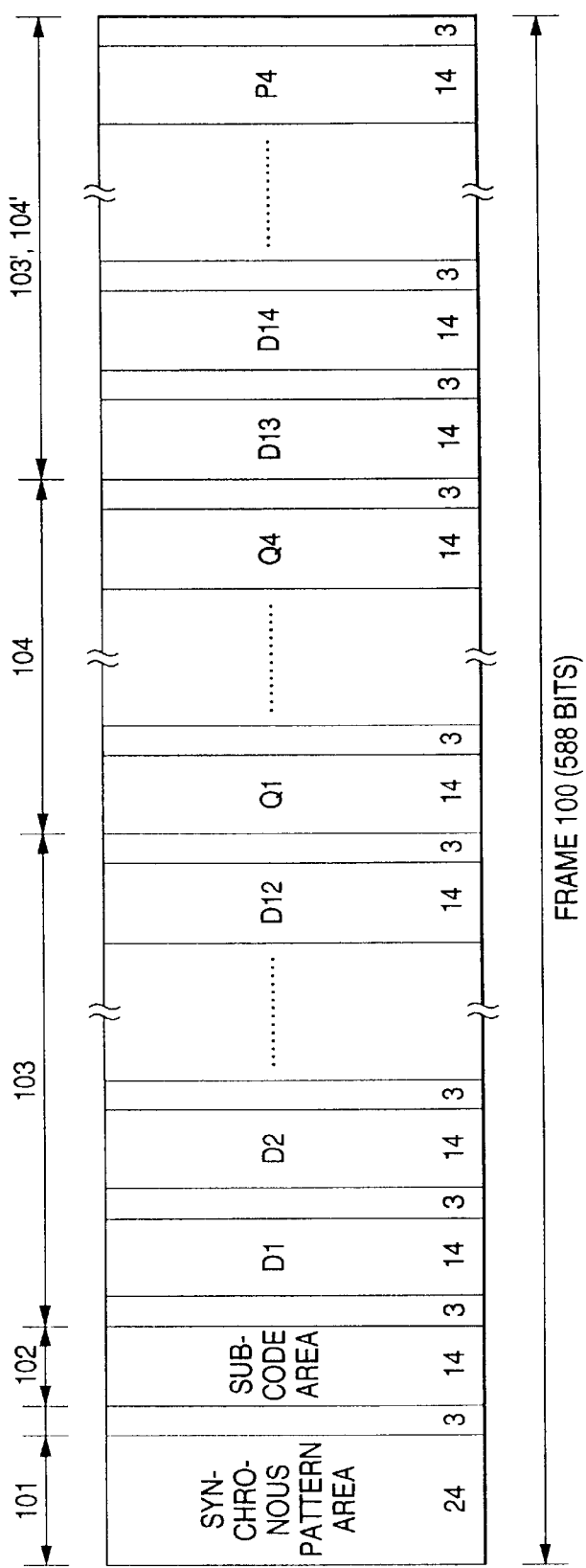
FIG. 2 is a view showing the data format of one frame after EFM modulation.

Each symbol is converted from 8 bits to 14 bits by the EFM modulation. FIG. 2 shows the data format of 1 frame (24 symbols=588 bits) after the EFM modulation. A frame 100 is composed of a synchronous pattern area 101 of 24 bits, sub-code area 102 of 14 bits, main data area 103 including the main data D1–D12 of 12 symbols, parity data area 104 including the parity data Q1–Q4 of 4 symbols, program data area 103' including the main data D13–D24, and parity data area 104' including the parity data P1–P4. Three connection bits are placed between each area and each data, and 1 frame 100 is formed of total 588 channel bits.

Figures 3, 4:
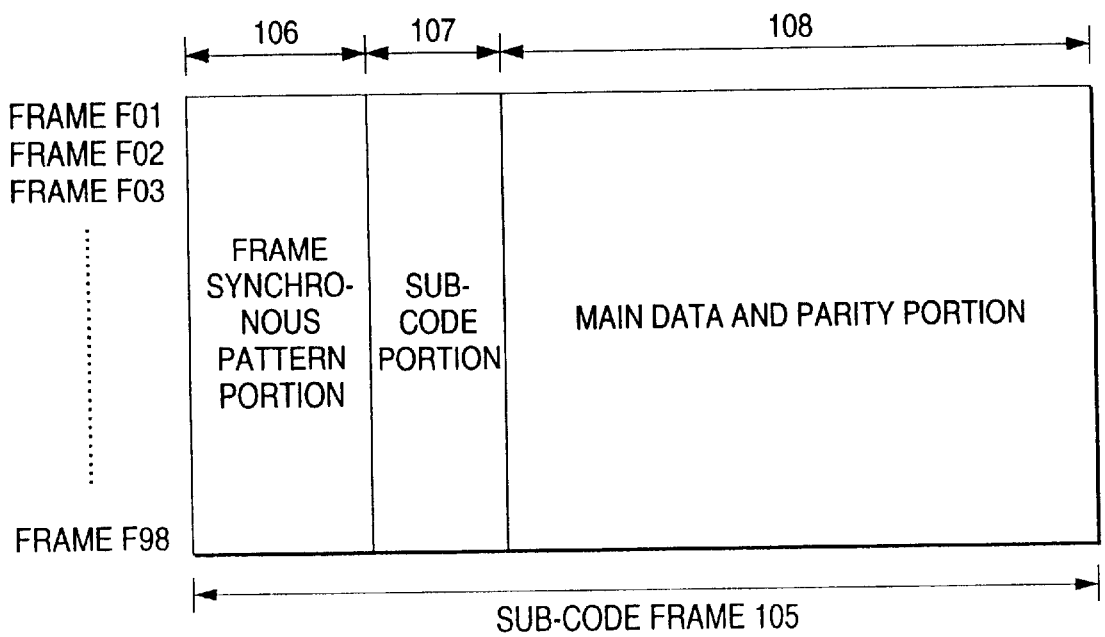
FIG. 3 is a view showing the sub-code frame in FIG. 2.
FIG. 4 is a view showing the detail of the sub-code portion in FIG. 3.

One sub-code frame 105 is structured by 98 frames 100 (refer to FIG. 3). The sub-code frame 105 is composed of a frame synchronous pattern portion 106, sub-code portion 107, main data and parity portion 108.

FIG. 4 shows the detail of the sub-code portion 107. The first 2 frames F01 and F02 are the synchronous patterns S0 and S1 of the sub-code frame. Incidentally, as the synchronous pattern, a pattern of the out-of-rule which does not exist, is adopted by the EFM modulation. That is, S0 is "00100000000001" and S1 is "00000000010010". By the following frames F03–F98, P channel to W channel of the sub-code are structured. In the P channel, the information showing the starting position of each program, and in the Q channel, the information such as the absolute time (A-Time) of the program, the elapsed time of the program (P-Time), and the number of program, and the like, is recorded. In the R channel to the W channel, the related data relating to the disk, specifically, the CD graphic (CD-G) information such as a still image or telop display, or the CD text information is recorded.

Figure 5:
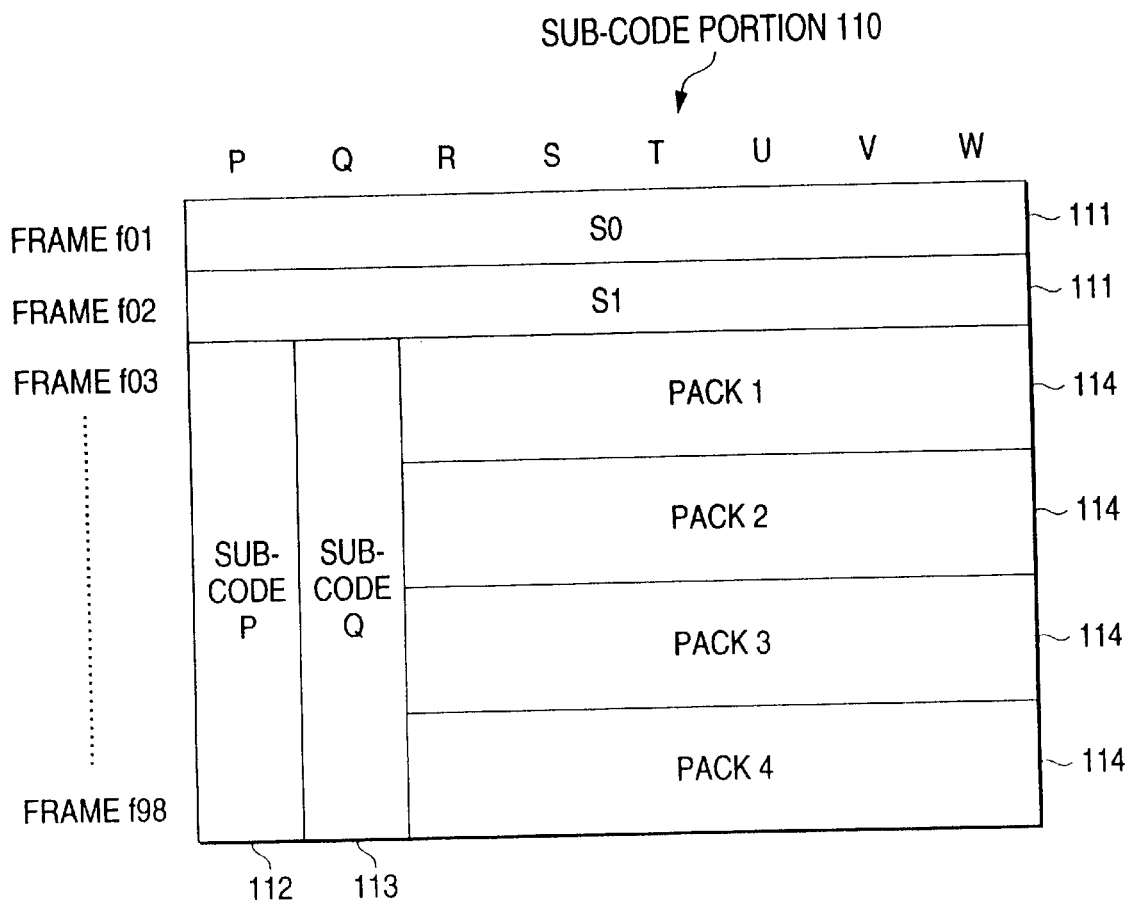
FIG. 5 is a view showing the sub-code portion in the lead-in area.

FIG. 5 shows the format of the sub-code portion 110 recorded in the lead-in area 11. One sub-code frame is formed of 8 bits from the P channel to W channel, and the sub-code portion 110 is structured by 98 sub-code frames. The first 2 frames f01 and f02 are the synchronous patterns S0 and S1, and a sub-code P block 112 are structured by the P channel from the other frames f03 to f98, and a sub-code Q block 113 is structured by a Q channel from frame f03 to f98, and an R-W block 114 is structured by an R channel to W channel from the frame f03 to f98.

Figure 6:
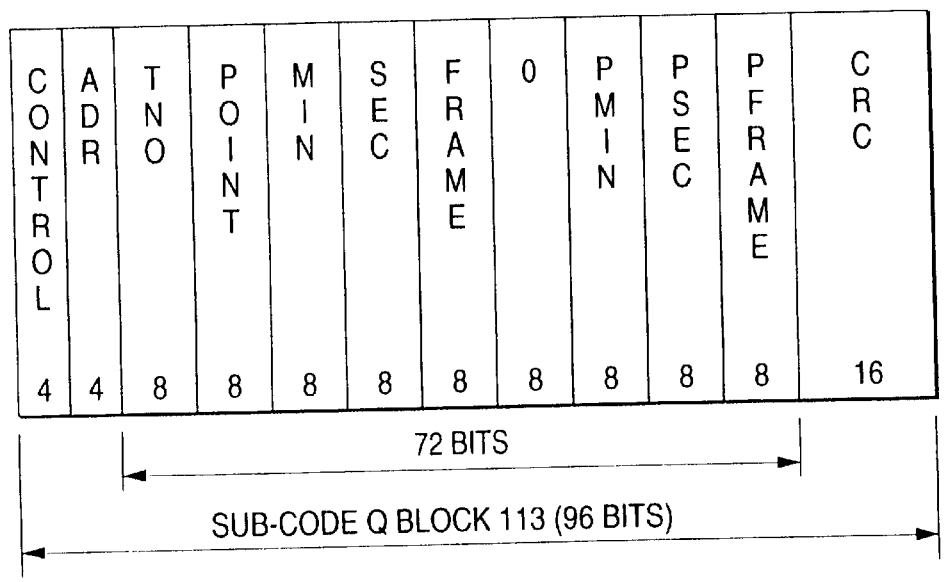
FIG. 6 is a view showing the format of the sub-code Q block in FIG. 5.

The format of the Q block 113 of the sub-code is shown in FIG. 6. The Q block 113 is composed of 96 bits, and 72 bits from TNO to PFRAME are data. The TNO is always 00, and a POINT shows the kind of the information from a MIN to the PFRAME. When the value of the POINT is 01–99, a PMIN, PSEC, PFRAME show the start address (absolute time) of each program. Further, when the value of the POINT is A0, the PMIN shows the first program number of the disk, and the other PSEC and PFRAME are 00. Further, when the value of the POINT is A1, the PMIN shows the last program number of the disk, and the other PSEC and PFRAME are 00. Further, when the value of the POINT is A2, the PMIN, PSEC, and PFRAME shows the start address of the read-out area 13.

Figure 7:
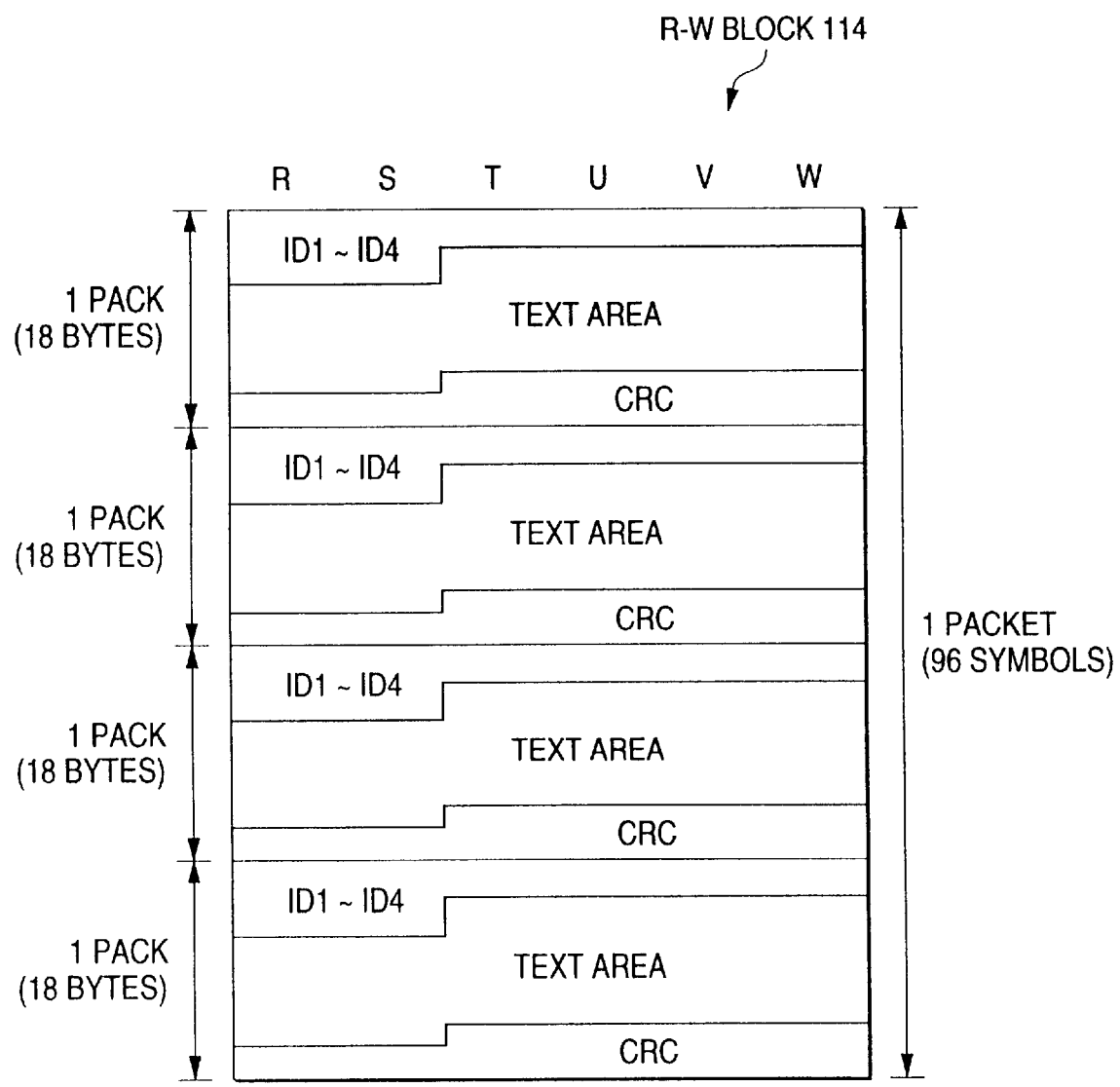
FIG. 7 is a view showing the detail of the R-W block in FIG. 5.

FIG. 7 shows the detail of the R-W block 114 shown in FIG. 5. The block 114 is structured by 96 symbols each of which is composed of 6 bits, and 24 symbols in which 96 symbols are divided by 4, are called 1 pack, and 4 packs are called 1 packet.

Figure 8:
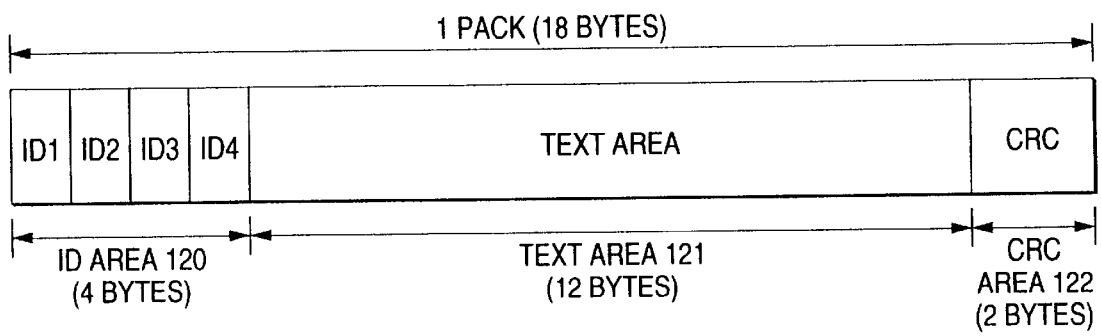
FIG. 8 is a view showing the format of each pack in FIG. 7.

Each pack is formed of the format shown in FIG. 8. Four bytes from the top of the pack are allocated to an ID area 120, and a 12 bytes text area 121 in which the text information of 8 bit unit is recorded, follows after it, and the a CRC area 122 of 16 bits to detect the error is allocated to the last.

The ID area 120 is composed of ID1–ID4 separated by one byte unit, and in the ID1, the setting information to set the recording mode of the information recorded in the pack, and the discrimination information showing the kind of the text information are recorded. The higher 3 bits of the ID1 show the setting information, and in the case of the CD text, it is the mode 4 ("100"). The other lower bits of the ID1 show the discrimination information. The ID2 shows to which track the text information belongs. The ID3 is the consecutive numbers attached to the blocks. The ID4 shows the character code and the character position of the character rows of the present pack.

Next, the signal arrangement of the CD-R and its signal format will be described. The blank CD-R has a pre-groove (not shown) which is weaving (wobbling) in the radial direction with the center frequency of 22.05 kHz over almost the whole of its recording surface as shown in FIG. 1(A). This pre-groove is used not only for guiding the light beam from the optical head, but also for showing the address information and for controlling the disk rotation.

FIG. 1 (B) shows the signal arrangement of the CD-R 20 which is in the partial recording condition in which the finalization is not completed. According to the drawing, in the CD-R 20, programs P1–P3 are recorded in a program area 22, a trace on which a certain trial writing is conducted to obtain the optimum power for each disk, exists in a power calibration area (PCA) 24 prepared inside the lead-in area 21, and the contents data upto the program P3 which is recorded already, is recorded in the program memory area (PMA) 25, in order to enable the program to be additionally written in the program area 22. Incidentally, this contents data is composed of the following 4 data: (1) the track number including the start time and the end time; (2) the disk identification to discriminate each disk; (3) the skip/un-skip information; and (4) the RID code in the user data field of the TOC.

Herein, referring to FIG. 9, the encoding format of the PMA 25 will be described. The S0 and S1 are the same synchronous patterns as the S0 and S1 (FIG. 5) of the CD-DA, and the copy protection information and emphasis information are recorded in a CONTROL. A TNO is always 00. A ZERO is a counter showing continuous frames, and a CRC is an error correcting code.

An ADR shows the kind of the information from the POINT to PFRAME except for the ZERO. When the ADR is 1, the POINT shows the track number, the MIN, SEC and FRAME show the end time of the track, and the PMIN, PSEC and PFRAME show the start time of the track. When the ADR is 2, it is shown that the POINT to PFRAME are the data relating to the disk discrimination.

When the ADR is 3, the POINT shows the total number of tracks which are track skip-designated, and can obtain the maximum value of 21. That is, the total number of tracks which can be skip-designated is to the maximum 21 portions. In this case, the MIN–PFRAME respectively show the number of the track. For example, when the numbers of tracks which are track skip-designated, are 3, 4 and 7, the value of MIN is 3, the value of SEC is 4, and the value of FRAME is 7, and the values of remaining PMIN–PFRAME are 0. When the ADR is 4, reversely to the case of the ADR of 3, the POINT shows the un-skip information. Incidentally, when the tracks which are skip-designated or un-skip-designated, are not smaller than 7 portions, the numbers of tracks are recorded being separated into the plurality of block data as shown in FIG. 9.

On the one hand, when the ADR is 5, the POINT shows the total number of the ranges which are area skip-designated, and can obtain the maximum value of 40. That is, the portion which can be area skip-designated, is to maximum 40 portions. In this case, the MIN–FRAME show the end time of each range, and PMIN–PFRAME show the start time of each range. Accordingly, when 3 portions are area skip-designated, three of the blocks in FIG. 9 are recorded. Incidentally, the ADR=6–F, is prepared as the future standard.

FIG. 1(C) shows the signal arrangement of the CD-R 20 whose finalization is completed. The read-out data is recorded in the read-out area 23 following the end portion of the program area 22, and the control data (TOG data) including the contents data recorded in the PMA 25 is recorded in the lead-in area 21. Accordingly, the CD-R 20 in which the TOC is recorded, can be reproduced by the common CD player in the same manner as the CD-DA 10.

Figure 10:
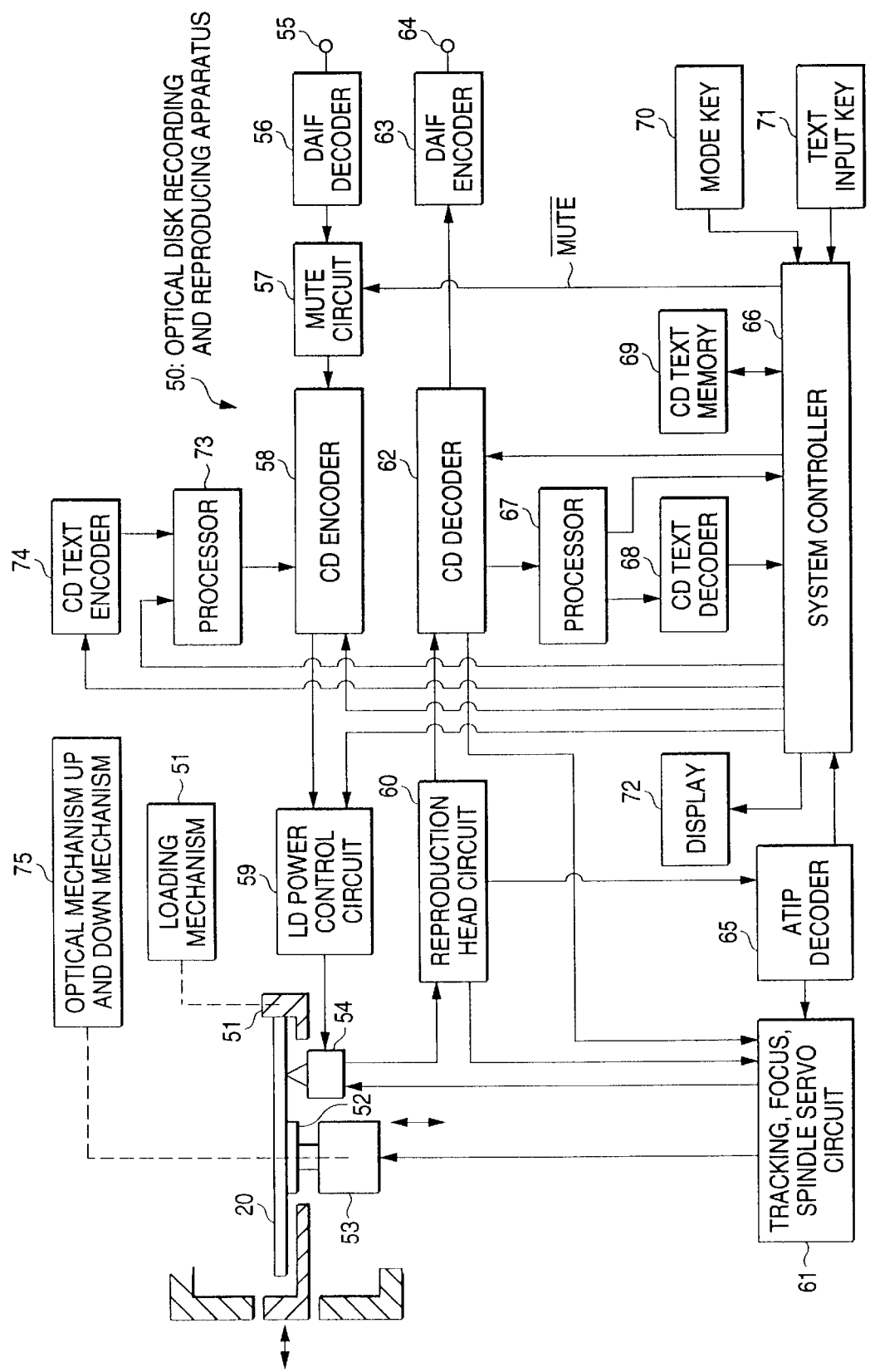
FIG. 10 is a block circuit diagram showing a circuit of an embodiment of a disk recording and reproducing apparatus to which the present invention is applied.

Next, referring to FIG. 10, an embodiment of the optical disk recording and reproducing apparatus 50 of the present invention will be described. The disk 20 is transferred between the reproduction position at which the disk 20 can be loaded on the disk table 52, and the ejection position which is protruded outside the apparatus and at which the disk can be attached to and detached from the disk table 52, by the disk loading mechanism 51 structured by including the tray. The spindle motor 53 and the optical head 54 are moved up and down between a clamp position at which the disk 20 is clamped on the disk table 52, and an un-clamp position which is withdrawn downward, by the optical mechanism up and down mechanism 75. Incidentally, in the drawing, the damper on the disk is omitted. The disk 20 loaded on the disk table 52 is driven by the spindle motor 53, and recording and reproducing are conducted by the optical head 54.

A digital input signal according to the digital audio interface format, inputted into the digital input terminal 55, is decode processed into the 44.1 kHz, 16 bits 2 channels digital audio data row, by the digital audio interface (DAIF) decoder 56, and inputted into a CD encoder 58 through a mute circuit 57. Incidentally, the digital audio data row is a 2'S complement code, and the mute circuit 57 conducts audio muting according to the mute signal (bar MUTE) from the system controller 66, which will be described later, by making all of the data row "L" status.

The CD encoder 58 converts the inputted data into the interleave whose 8 bits is defined as 1 symbol unit, error correcting code addition, sub-code addition, EFM modulation, synchronous frame addition, and NRZI (Non Return to Zero Inverse) signal, and outputs it to an LD power control circuit 59.

The sub-code is generated by the system controller 66. In the present embodiment, the system controller 66 is composed of 2 microcomputers (not shown). Each microcomputer is composed of a CPU, ROM, and RAM, and the first microcomputer (mechanism computer) controls mainly the mechanism control, and conducts the control of the ATIP decoder 65 or servo circuit 61, TOC or PMA control. The control conducted by the mechanism computer will be briefly described below.

ATIP Processing

The wobble signal WBL is obtained from the reproduction head circuit and the following control is conducted.
(1) The wobble signal is bi-phase demodulated.
(2) The signal is separated into the sink, time data, and CRC.
(3) The sink is made to the ATIP (Absolute Time In Pre-groove) sink, and converted into the timing signal.
(4) The CRC of the time data is checked, and when there is no error, it is set as a determined value.

Servo Control (1) Open/close of the focus servo and tracking servo is switched.
(2) The linear velocity constant control of the spindle servo is conducted.

System Protection Processing

In order to avoid the existence of the double recording or no-recording portion due to the interruption of recording or track off-positioning caused by the unexpected power failure or impact from the outside,
(1) the recording position control, and
(2) the observation of the tracking condition, are conducted, and when the abnormal condition is generated, the back-up circuit is operated, and protection processing is conducted and the quick release is conducted.

Setting of the Optimum Recording Power

Before the start of recording, the trial writing is conducted in the PCA area, and the optimum recording laser power is obtained, and is set in the APC circuit.

TOC (PMA) Data Generation/Control (1) The assignment of the start position and end position of the additional recording
(2) The recording of the end position of the additional recording
(3) The generation, storing, and recording of the PMA
(4) The generation and recording of the TOC.

Sub-Code Data Processing

As the processing at the time of the sub-code recording,
(1) the sub-code is generated, and
(2) the sub-code addition timing is generated by using the ATIP sink, or the like.

As the processing at the reproduction,
(1) the sub-code is extracted on the basis of the sink, and
(2) the sub-code is decoded and sent to the display, or the similar devices.

On the one hand, the second microcomputer (mode computer) mainly conducts operation displays, and conducts the special function, system control, control of the digital input system, and switching of audio signal system.

The mode keys 70 operated by the user, such as the record key, reproduction key, stop key, ejection/loading key, finalizing key to designate the disk finalization, the text input key 71 from which the user inputs the CD text information, and the display 72 to display its operation condition or text information, are connected to the system controller 66, and the system controller 66 conducts the operation control of the overall apparatus according to the flow charts shown in FIG. 11 to FIG. 17, which will be described later.

Further, to the system controller 66, the CD text memory 69 in which the text data inputted by the operation of the text input key 71 is stored, is connected. The system controller 66 supplies the CD text data stored in this CD text memory 69 to the CD text encoder 74. Further, the system controller 66 generates the sub-code P and Q channels, and supplies them to the sub-code processor 73.

The CD text encoder 74 encodes the sub-code of the R–W channels, and supplies it to the sub-code processor 73. The sub-code processor 73 adds the error correcting code to the inputted sub-code of the Q channel, and supplies the sub-codes of the P–W channels to the CD encoder 58.

The LD power control circuit 59 supplies the signal supplied from the CD encoder 58, to the optical head 54, and has the adjustable laser power circuit by which the laser power of the optical head 54 is adjustably set. This setting is conducted in such a manner that, by conducting the trial writing in the PCA 24 (refer to FIG. 1), the optimum recording laser power value obtained by the system controller 66 is set.

On the one hand, the reproduction signal read out by the optical head 54 is inputted into the reproduction head circuit 60. The reproduction head circuit 60 conducts the processing of the generation of the RF signal and its binarization, and generation of the tracking error signal and the focus error signal. Each error signal is inputted into the servo circuit 61, and the tracking servo control and the focus servo control of the optical head 54 are conducted.

The RF signal which is binarized by the reproduction head circuit 60 is inputted into the CD decoder 62. The CD decoder 62 conducts the same processing as the common CD player, and the inputted signal is EMF demodulated, error corrected, and de-interleaved, and converted into the 44.1 kHz, 16 bits, 2 channel digital audio data row, and outputted. This data row is inputted into the digital audio interface encoder 63, and outputted from the digital output terminal 64 as the digital output signal according to the digital audio interface format.

Further, the wobble signal generated in the reproduction head circuit is binarized, and also inputted into ATIP (Absolute Time In Pre-groove) decoder 65. The ATIP decoder 65 FM-demodulates the wobble signal, extracts the ATIP sink signal, and supplies it to the servo circuit 61. The servo circuit 61 conducts the spindle servo control according to the ATIP sink signal so that the linear velocity of the disk at the recording becomes constant. Further, the ATIP decoder 65 decode processes the ATIP signal, and supplies the read-out address information to the system controller 66.

Further, the CD decoder 62 separates the sub-code at the EFM demodulation, and supplies the sub-code to the sub-code processor 67. The sub-code processor 67 detects the error of the sub-code, and separates the sub-code into the P channel, Q channel (refer to FIG. 6), and the R–W channels (refer to FIG. 7), and outputs them. The P channel and Q channel data are supplied to the system controller 66, and the R–W channel data is supplied to the CD text decoder 68.

The CD text decoder 68 decodes the sub-code of the R–W channels, and supplies to the system controller 66. The system controller 66 stores and holds the supplied sub-code in the CD text memory 69, and displays the CD text information on the display 72.

Next, referring to the flow chart shown in FIG. 11 to FIG. 17, an example of the operation of the apparatus of the above embodiment will be described. Initially, the operation when the ejection/loading key is operated, and the disk loading command is received, will be described.

Figure 11:
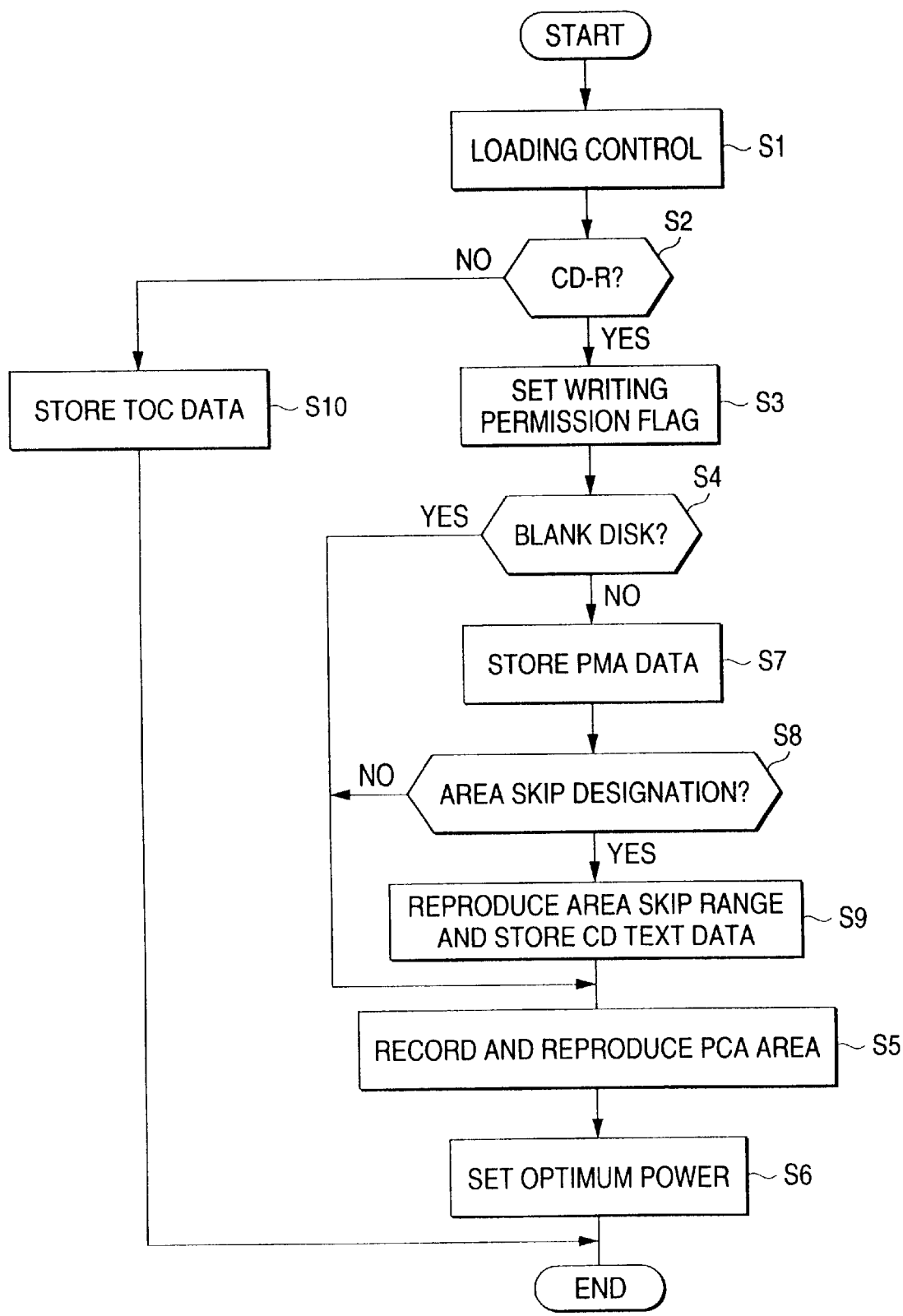
FIG. 11 is a flow chart used for the description of the operation of the apparatus of the present embodiment.

When the disk loading command is received, the system controller 66 starts the control of whole system according to the flow chart shown in FIG. 11. Initially, the system controller 66, in step S1, controls the disk loading mechanism 51 and optical mechanism up-down mechanism 75, and sets the disk 20 at the ejection position onto the disk table 52. Next, the system controller 66, in step S2, judges whether loaded disk 20 is the CD-R (the finalized CD-R is not included) of the blank or in the partial recording condition, or not. This judgement is conducted by reproducing the lead-in area of the disk 20 and by detecting the existence of the RF signal. When the disk is the CD-R (YES), the system controller 66 raises the write permission flag in step S3.

Following that, the system controller 66, in step S4, judges whether the CD-R is the blank disk. This judgement is conducted by reproducing the PMA 25, and by detecting the existence of the RF signal and by reading-in the sub-code information.

When it is the blank disk (step S3 YES), the system controller 66, in step S5, controls the LD power control circuit 59 and conducts recording and reproducing with respect to the PCA area 24 of the disk, and finds the optimum writing power in step S6, and sets the writing laser power of the LD power control circuit 59.

On the one hand, when the CD-R is not the blank disk (step S4=NO), the system controller 66, in step S7, reproduces the PMA data, and stores it in the internal RAM. Following that, the system controller 66, in step S8, judges whether the PMA data of the area skip designation (ADR=5) exists. This is, as described later, for the reason why, when the apparatus of the present embodiment temporarily records the CD text program data in which the CD text data is inserted into the sub-code, in the program area 22, the recording area of the CD text program data is area-skip-designated by the PMA data.

Figure 9:
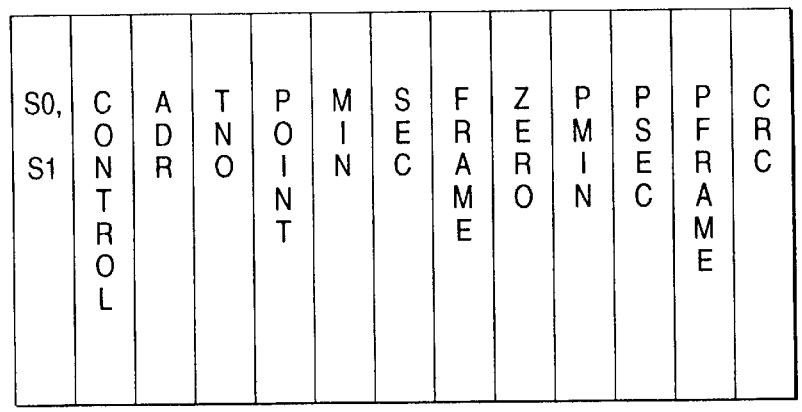
FIG. 9 is a view showing the encoding format of the PMA.

When the PMA data of the area skip designation exists (step S8=YES), the system controller 66, in step S9, starts the reproduction of the range of the designated area skip (the range designated from the PMIN, PSEC, PFRAME to the MIN, SEC, FRAME in FIG. 9), and stores the CD text data recorded in the sub-code R channel–W channel included in the program data, in the CD text memory 69. When the PMA data having the area skip designation does not exist (step S8=NO), the system controller 66 advances to the step S5.

On the one hand, when the CD-DA or the CD-R which is finalized, is loaded (step S2=NO), the system controller 66, in the same manner as the ordinary CD player, in step S10, reproduces the TOC data, stores it in the internal RAM, and the control is completed. By the above description, the operation for the disk loading command is completed.

Next, the operation when the recording start command by the simultaneous operations of the REC key and PLAY key is received, will be described. Incidentally, it is assumed that the disk 20 is already set on the disk table, and the operation for the disk loading command is completed.

Figure 12:
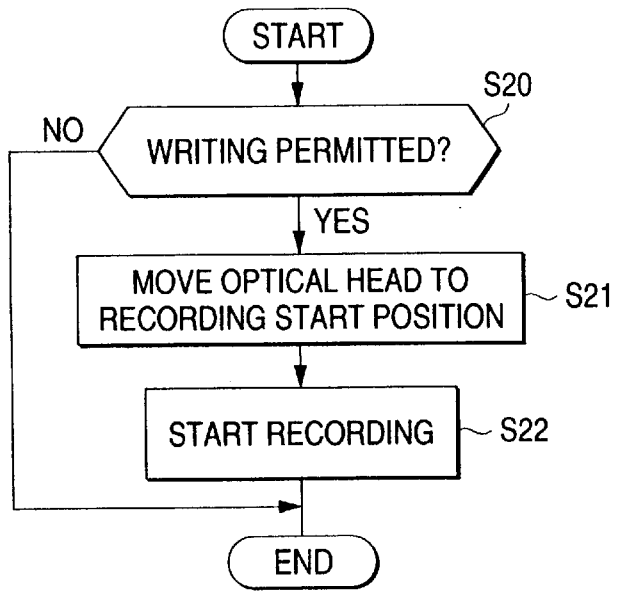
FIG. 12 is a flow chart used for the description of the operation of the apparatus of the present embodiment.

The system controller 66 starts the control of the overall apparatus according to the flow chart shown in FIG. 12, and initially, judges whether the write permission flag is raised, in step S20. When the writing is permitted (step S20=YES), the system controller 66 moves the optical head 54, in step S21, to the recording start position (when the program is already recorded, its end position), and starts, in step S22, the recording of the digital input signal inputted in the digital input terminal 55. On the one hand, when the writing is not permitted (step S20=NO), the system controller 66 neglects this recording start command.

Next, the operation when the stop command-by the operation of the stop key is received, will be described.

Figure 13:
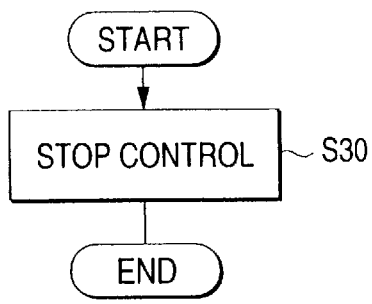
FIG. 13 is a flow chart used for the description of the operation of the apparatus of the present embodiment.

The system controller 66 starts the control of the overall apparatus according to the flow chart shown in FIG. 13, and in step S30, conducts the stop control of the recording condition or there producing condition in step S30, and its operation control is completed.

Next, the operation when the reproduction command by the operation of the reproduction key is received, will be described.

Figure 14:
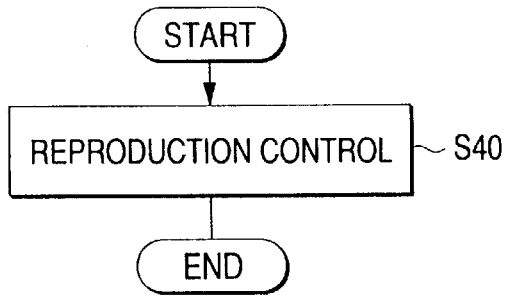
FIG. 14 is a flow chart used for the description of the operation of the apparatus of the present embodiment.

The system controller 66 starts the control of the overall apparatus according to the flow chart shown in FIG. 14, and in step S40, starts the reproduction of the disk. Incidentally, when the PMA data of the track skip designation or the area skip designation is stored, the system controller 66 skips the track or the area, and reproduces.

Next, in the stop condition, the operation when the text input is conducted by the operation of the text input key 71, will be described.

Figure 15:
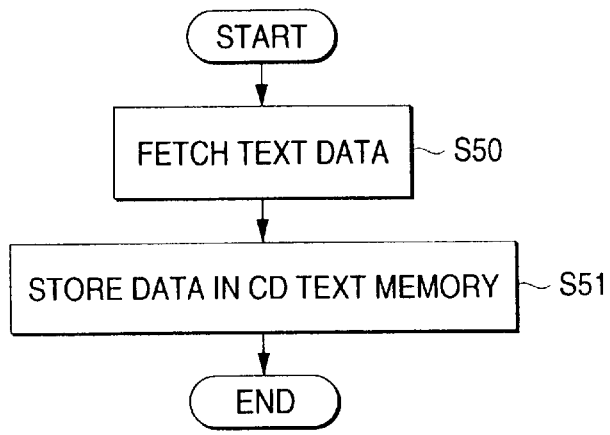
FIG. 15 is a flow chart used for the description of the operation of the apparatus of the present embodiment.

The system controller 66 fetches in the text data inputted by the operation of the text key 71, in step S50, according to the flow chart shown in FIG. 15, and in step S51, stores the text data in the CD text memory 69.

Next, the operation when the ejection command by the operation of the ejection/loading key is received, will be described.

Figure 16:
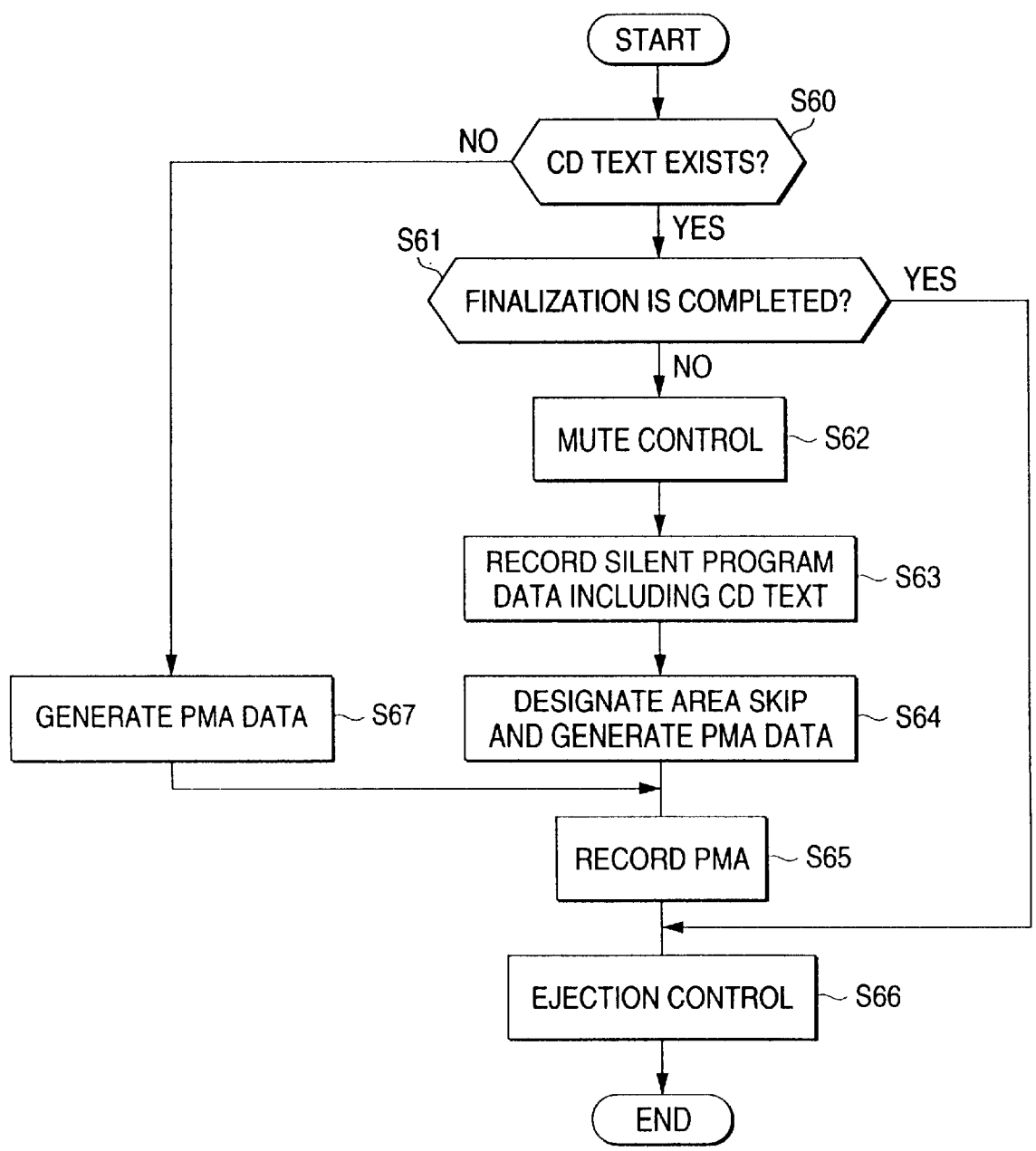
FIG. 16 is a flow chart used for the description of the operation of the apparatus of the present embodiment.

The system controller 66 starts the control of the overall apparatus according to the flow chart shown in FIG. 16, and initially, in step S60, judges whether the text data is stored in the CD text memory 69. When the text data is not stored (step S60=NO), the system controller 66, in step S67, generates the PMA data, and records the PMA data in the PMA 25 in step S65. After that, the system controller 66, in step S66, controls the disk loading mechanism 51 and the optical mechanism up and down mechanism 75, and moves the disk 20 to the ejection position.

On the one hand, when the text data which is key-inputted is stored in the CD text memory 69 (step S60=YES), the system controller 66, in step S61, judges whether the finalization is completed. When it is finalized (step S61=YES), the system controller 66 advances to the step S66, and moves the disk to the ejection position at once.

On the one hand, when it is not yet finalized (step S61=NO), the system controller 66 controls the mute circuit 57 (FIG. 1) in step S62, and audio-mutes the digital audio data row outputted from the digital audio interface 56. Then, system controller 66, in step S63, records the text data stored in the CD text memory 69 in an area from the sub-code R channel to the W channel, in more detail, records the program data which is inserted into the R01–W96 of the sub-code portion 107, succeedingly to the last program in the program area 22.

Then, the system controller 66, in step S64, generates the PMA data which area-skip-designates (ADR=5) the recording area of the CD text program data, and records the PMA data in the PMA 25 in step S65, then, moves the disk to the ejection position in step S66.

Finally, the operation when the finalization command by the operation of the finalization key is received, will be described.

Figure 17:
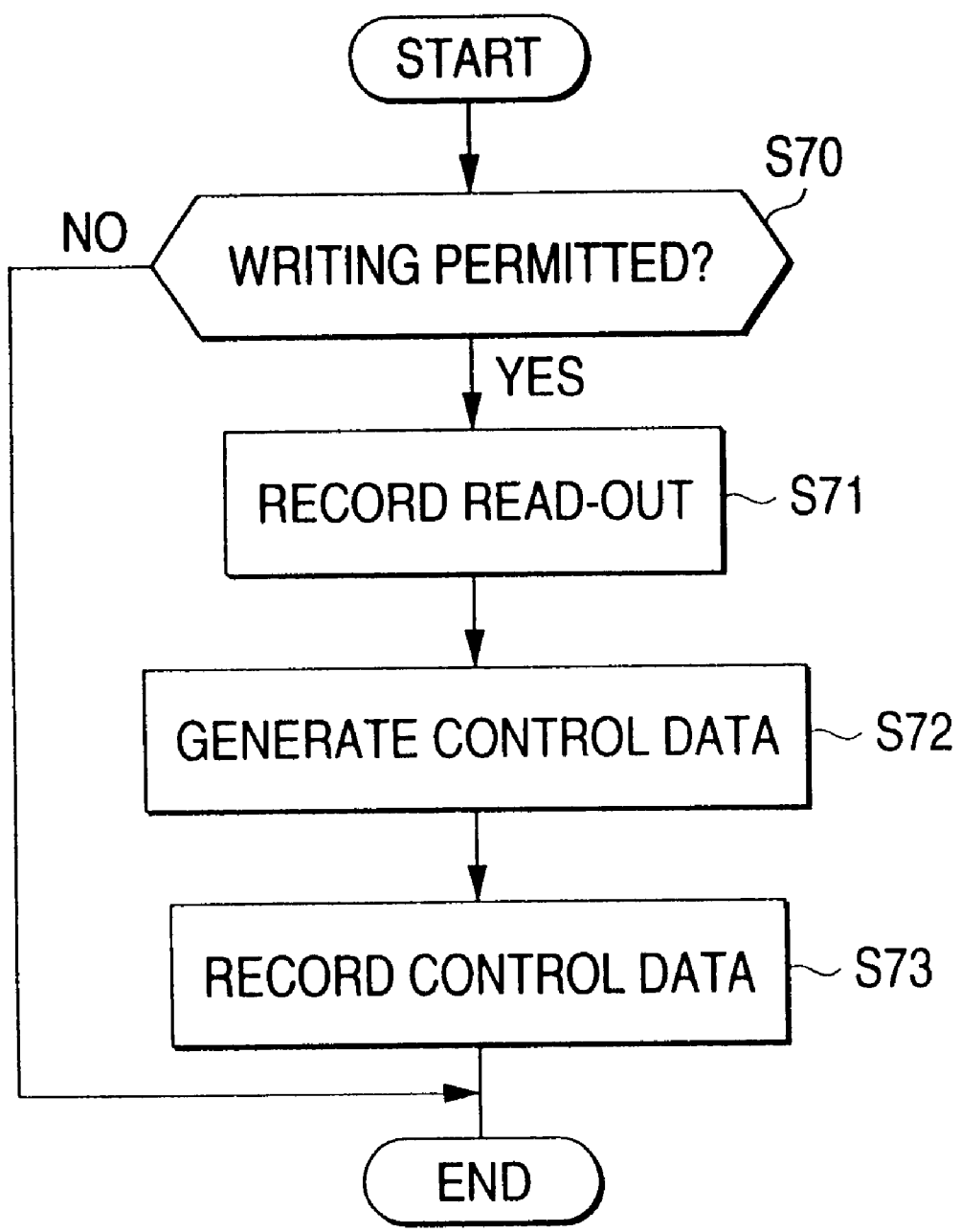
FIG. 17 is a flow chart used for the description of the operation of the apparatus of the present embodiment.

The system controller 66 starts the control of the overall apparatus according to the flow chart shown in FIG. 17. The system controller 66, in step S70, judges whether the writing permission flag is set. When the writing is permitted (step S70=YES), the system controller 66, in step S71, generates the read-out data, and records the read-out area 23 (FIG. 1(C)) in the last of the program, and next, in step S72, when the CD text data exists in the CD text memory 69, generates the TOC data on the base of the CD text data and the PMA data, and when the CD text data is not recorded, generates the TOC data on the base of the PMA data, and records in the read in area 21. The disk 20 in which this TOC data is written, has the same signal arrangement as the CD-DA 10 as shown in FIG. 1, and it can be reproduced by the common CD players. On the one hand, when the writing is not permitted (step S70=NO), the system controller 66 neglects the finalization command.

Incidentally, the present invention is not limited to the above embodiments, and it is of course that it can be varied into various modifications without departing from the range described in claims. For example, according to the apparatus of the embodiments, as shown in FIG. 16, corresponding to the ejection command, the program data (CD text program data) in which the CD text data is inserted into the sub-code, is recorded in the program area 22 (step S63 in FIG. 16), but, it may also be allowable that an exclusive use CD text temporary save key to temporarily save the CD text, is provided, and corresponding to the temporary save command by the operation of this key, this CD text program data is recorded in the program area 22.

Further, after the recording of the CD text program data, in step S64, the PMA data of ADR=5 to area-skip-designate the recording area of the CD text program data is generated, and the PMA data is recorded in the PMA 25 in the step S65, however, it is not limited to the area-skip-designation, but, it is of course that the CD text program data may be skip-reproduced by the track skip designation (the PMA data of ADR=3).

Further, in the CD player of the present condition, the products corresponding to the skip designation are still a few, and further, judging from the amount of the data of the CD text, because the reproduction time of the CD text program data is short, the skip designation is not always the necessary requirement.

Further, when the situation that the great part of the CD players meet the skip designation, comes in the future, because the CD text program data is surely skip-reproduced, it is not necessary to mute the output of the DAIF decode 56 at the time of program data recording.

On the one hand, according to the apparatus of the embodiments, the optical disk recording and reproducing apparatus to conduct recording and reproducing on the CD-R is described, however, the kind of the disk is not limited to the CD-R, but, it is of course that the apparatus which conducts recording and reproducing on the disk according to the other format, such as the CD-RW having the same disk format as the CD-R, may also be allowable. Specifically, in the case of the CD-RW, because the re-writing and deleting can be conducted, when the data of the CD text included in the CD text program data is stored in the memory, the CD text program data can be deleted, or it can be deleted by being overwritten by the next music program data.

Further, according to the apparatus of the embodiments, an example in which the present invention is applied to the audio use optical disk recording and reproducing apparatus, is described, however, as described in the conventional example, the present invention can also be applied to the recording software to control the CD-R drive connected to the personal computer.

Finally, it is described as an example that the CD text originally to be recorded in the control area is temporarily recorded in the program area, however, it is of course that the data is not limited to the CD text.

As described above, according to the present invention, because the related data recorded in the control area is temporarily recorded in the program area, the control data is not uselessly cleared. Further, because the disk is used as the temporary recording medium, the expensive HDD or memory is not necessary, and the cost is not increased. Further, because the related data is recorded on the disk, the correspondence relationship of the related data with the disk is always maintained, and the operability of the user is very excellent.

What is claimed is:

1. A recording apparatus which records information onto a disc, comprising:
    a recording device for recording program data in a program data area on the disc;
    a memory for storing text data which is to be recorded in a control data area on the disc; and
    a controller for controlling the recording device,
    wherein the controller generates temporary data including the text data and records the generated temporary data in the program data area, when a partial recording condition exists in which no finalization command has been made.

2. The apparatus according to claim 1, wherein the text data is for a title of the program.

3. The apparatus according to claim 1, wherein the temporary data is recorded when an ejection command has been made.

4. The apparatus according to claim 1, wherein the controller generates control data including the text data and records the control data in the control data area, when the finalization command has been made.

5. A method of recording information onto a disc, comprising:
    recording program data in a program data area on the disc;
    storing text data which is to be recorded in a control data area on the disc; and
    generating temporary data including the text data and recording the generated temporary data in the program data area, when a partial recording condition exists in which no finalization command has been made.

6. The method according to claim 5, wherein the text data is for a title of the program.

7. The method according to claim 5, wherein the temporary data is recorded when an ejection command has been made.

8. The method according to claim 1, wherein control data, including the text data, is generated and recorded in the control data area, when the finalization command has been made.

9. A optical disk recording apparatus which records a program area in which program data is recorded, and a lead-in area in which control data controlling the program data recorded in the program area and related data relating to a disk are recorded, into an optical disk, said optical disk recording apparatus comprising:
    when said optical disk is in a partial recording condition in which the finalization is not completed, a related data recording control means for recording the related data which is recorded in the lead-in area, in the program area,
    wherein the related data is the text data which is set by a user, and is recorded in the program area as a sub-code of the program data.

10. The optical disk recording apparatus according to claim 9, further comprising:
    a mute circuit to audio-mute an audio data; and
    a mute circuit control means for making said mute circuit to be in the mute condition, while the program data in which the related data is inserted into the sub-code, is recorded in the program area, wherein the program data includes the audio data as the main data.

11. The optical disk recording apparatus according to claim 9, further comprising:
    a contents data generation means for generating the contents data including a skip information to skip the reproduction of the program data recorded in the program area; and
    a contents data recording control means for recording the generated contents data in a program memory area, wherein
    when said optical disk is in the partial recording condition, said optical disk further has a content area to record the contents data of the program data which is recorded in the program area.

12. The optical disk recording apparatus according to claim 11, further comprising:
    a reproduction means for reproducing said optical disk;
    a memory to store the related data, and
    a related data reproduction control means for reproducing the related data recorded in the program area, according to the skip information included in the contents data, and for storing the reproduced related data in said memory.

13. The optical disk recording apparatus according to claim 12, further comprising:
    a disk loading means to transfer said optical disk between a reproduction position to reproduce said disk and an eject position at which said disk is ejected, wherein
    said related data reproduction control means corresponds to the fact that said optical disk is transferred to the reproduction position by said disk loading means, and reproduces the related data recorded in the program area.

14. The optical disk recording apparatus according to claim 12, further comprising:
a control data generating means for generating the control data including the related data stored in said memory corresponding to a finalization command; and
a control area recording control means for recording the generated control data in the control area.

15. The optical disk recording apparatus according to Claim 9, further comprising:
a disk loading mechanism to disk-reproduce the optical disk; and
an eject/load control means for controlling said disk loading mechanism, wherein
said eject/load control means controls said disk loading mechanism and moves said optical disk to the ejection position, after said related data recording control means records the related data in the program area when an ejection command is inputted.

16. The optical disk recording apparatus according to claim 9, wherein said related data recording control means records the related data in the program area, when a temporary save command to temporarily save the text data is inputted.

17. A recording control method of an optical disk recording apparatus to record a program area in which the program data is recorded, and a lead-in area in which control data to control the program data recorded in the program area and related data relating to said disk, are recorded, in an optical disk,
said recording control method comprising:
a step of recording said optical disk in the partial recording condition in which the finalization is not completed,
a step of recording the related data recorded in the lead-in area in the program area,
wherein the related data is the text data which is set by a user, and is recorded in the program area as a sub-code of the program data.

18. A optical disk recording apparatus which records a program area and a lead-in area, into an optical disk, said optical disk recording apparatus comprising:
a recording controller for recording text data which is recorded in the lead-in area, into the program area in a partial recording condition in which a finalization is not completed.

19. The optical disk recording apparatus according to claim 18, wherein said text data is title or name of a musical component of the optical disk.

20. The optical disk recording apparatus according to claim 18, wherein said recording controller records the text data into the program area when an ejection command is received in the partial recording condition.

21. The optical disk recording apparatus according to claim 20, wherein said recording controller records the text data recorded in the program area, into the lead-in area wherein a finalization command is received.

22. A optical disk recording apparatus which records a program area in which program data is recorded, and a lead-in area in which control data controlling the program data recorded in the program area and related data relating to a disk are recorded, into an optical disk, said optical disk recording apparatus comprising;
when said optical disk is in a partial recording condition in which the finalization is not completed, a related data recorder which records the related data which is recorded in the lead-in area, in the program area,
wherein the related data is the text data which is set by a user, and is recorded in the program area as a sub-code of the program data.

23. The optical disk recording apparatus according to claim 22, further comprising:
a mute circuit to audio-mute an audio data; and
a mute control which makes said mute circuit to be in the mute condition, while the program data in which the related data is inserted into the sub-code, is recorded in the program area, wherein
the program data includes the audio data as the main data.

24. The optical disk recording apparatus according to claim 22, further comprising:
a contents data generator which generates the contents data including a skip information to skip the reproduction of the program data recorded in the program area; and
a contents data recorder which records the generated contents data in a program memory area, wherein
when said optical disk is in the partial recording condition, said optical disk further has a contents area to record the contents data of the program data which is recorded in the program area.

25. The optical disk recording apparatus according to claim 24, further comprising:
a reproducing device which reproduces said optical disk;
a memory to store the related data; and
a related data reproduction controller which reproduces the related data recorded in the program area, according to the skip information included in the contents data, and which stores the reproduced related data in said memory.

26. The optical disk according apparatus according to claim 25, further comprising:
a disk loading mechanism to transfer said optical disk between a reproduction position to reproduce said disk and an eject position at which said disk is ejected, wherein
said related data reproduction controller corresponds to the fact that said optical disk is transferred to the reproduction position by said disk loading mechanism, and reproduces the related data recorded in the program area, 27. The optical disk recording apparatus according to claim 25, further comprising:
a control data generator which generates the control data including the related data stored in said memory, corresponding to a finalization command; and
a control area recorder which records the generated control data in the control area.

28. The optical disk recording apparatus according to claim 22, further comprising:
a disk loading mechanism to disk-reproduce the optical disk: and
an eject/load controller which controls said disk loading mechanism, wherein
said eject/load controller controls said disk loading mechanism and moves said optical disk to the ejection position, after said related data recorder records the related data in the program area when an ejection command is inputted.

29. The optical disk recording apparatus according to claim 22, wherein
said related data recorder records the related data in the program area, when a temporary save command to temporarily save the text data is inputted.

* * * * *